(12) United States Patent
Mendel (10) Patent No.: US 12,381,770 B2
(45) Date of Patent: Aug. 5, 2025

(54) SYSTEMS AND METHODS FOR TRANSMITTING AND RECEIVING AUXILIARY DATA

(71) Applicant: Intel Corporation, Santa Clara, CA (US)

(72) Inventor: David Mendel, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 809 days.

(21) Appl. No.: 17/478,949

(22) Filed: Sep. 19, 2021

(65) Prior Publication Data

US 2022/0006682 A1 Jan. 6, 2022

(51) Int. Cl.
*H04L 27/34* (2006.01)
*H04L 27/02* (2006.01)
*H04L 27/36* (2006.01)

(52) U.S. Cl.
CPC ............ *H04L 27/345* (2013.01); *H04L 27/36* (2013.01); *H04L 27/02* (2013.01)

(58) Field of Classification Search
CPC ....... H04L 27/345; H04L 27/36; H04L 27/02; H04L 27/3461; H04L 27/3477; H04L 1/0042
See application file for complete search history.

(56) References Cited

U.S. PATENT DOCUMENTS

| 2011/0188613 A1* | 8/2011 | Dowling | H04L 1/0054 |
| | | | 375/320 |
| 2019/0102298 A1* | 4/2019 | Hasbun | G11C 11/4074 |
| 2019/0199572 A1 | 6/2019 | Limberg | |
| 2020/0244370 A1 | 7/2020 | Stojanovic et al. | |
| 2021/0328852 A1 | 10/2021 | Shimanouchi et al. | |

OTHER PUBLICATIONS

European Patent Office, extended European Search Report and European Search Opinion for European patent application 22181605.5 dated Dec. 2, 2022, pp. 1-10.
Chorchos, "PAM-6 generation using 32-QAM Constellation," Proceedings of SPIE, ISSN 0277-786X, vol. 10946, 2019, pp. 1-10.

* cited by examiner

*Primary Examiner* — Sam K Ahn
*Assistant Examiner* — Amneet Singh
(74) *Attorney, Agent, or Firm* — InventIQ Legal LLP; Steven J. Cahill (57) ABSTRACT

A data transmission system includes a transmitter circuit. The transmitter circuit receives regular data bits and auxiliary data bits. The transmitter circuit encodes a first subset of the regular data bits to generate a first subset of encoded data comprising pairs of symbols that are used in quadrature amplitude modulation. The transmitter circuit encodes the auxiliary data bits and a second subset of the regular data bits to generate a second subset of the encoded data comprising at least one pair of symbols that are unused for encoding by the quadrature amplitude modulation. The transmitter circuit generates a modulated output signal that indicates the first and second subsets of the encoded data using pulse amplitude modulation.

20 Claims, 4 Drawing Sheets

SYSTEMS AND METHODS FOR TRANSMITTING AND RECEIVING AUXILIARY DATA

FIELD OF THE DISCLOSURE

The present disclosure relates to electronic circuit systems, and more particularly, to systems and methods for transmitting and receiving auxiliary data.

BACKGROUND

Modern electronic devices such as computers, mobile phones, computer servers, and even vehicles communicate in a variety of ways. Wireline communication has historically used Pulse-Amplitude Modulation (PAM) to enable high-speed transmission. PAM communication uses pulses of different amplitudes that define multiple bits per pulse. PAM is often referred to as PAM-n, where n may be an integer value that is a power of 2 (e.g., PAM-2, PAM-4, and PAM-8) and that refers to the number of different possible amplitudes that each pulse may have. Wireless communication systems often use a different form of signal modulation to encode message information for high-speed passband wireless transmission (e.g., over-the-air, coherent optical fiber communication). Wireless communication has historically used Quadrature Amplitude Modulation (QAM) to enable the high-speed wireless transmission. While effective for a variety of media that can support frequencies much higher than the desired data transfer rate, QAM involves additional processing overhead.

DETAILED DESCRIPTION

Pulse Amplitude Modulation (PAM) communication uses pulses of different amplitudes to define multiple bits per pulse. PAM is often referred to as PAM-n, where n may be an integer value that is a power of 2 (e.g., PAM-2, PAM-4, and PAM-8) or an integer value that is not a power of 2 (e.g., PAM-3 and PAM-6). The n in PAM-n refers to the number of different possible amplitudes that each pulse may have. Thus, PAM-n uses n different symbols to enable high-speed signal transmission. PAM-2, a variant of PAM, where one bit of information is carried with two possible signal levels, is often used for modulation for transmission of up to 50 gigabits/second in signal transmission. PAM-4, a variant of PAM, where two bits of information are carried with four possible signal levels, is used for modulation for transmission of 50 gigabits/second (Gbps) and above. The encoding and decoding between the information bits and the PAM-n symbols is relatively straightforward when n is an integer power of 2. However, when n is not an integer power of 2, the encoding and decoding may not be uniquely determined, involving trade-offs between latency and coding rate. As data rates increase, PAM-n, where n is an integer power of 2, may falter when wireline transmission approaches 200 Gbps, requiring PAM-n that is in-between PAM-4 and PAM-8.

Quadrature Amplitude Modulation (QAM) may be used to enable wireline communication or wireless communication (e.g., over-the-air (OTA), optical fiber). QAM involves IQ modulation, where an I component symbol stands for in-phase and a Q component symbol stands for quadrature-phase. The I component symbol and Q component symbol may be baseband signals generated by encoding input bits according to a QAM constellation diagram to produce IQ data that includes the I component and the Q component. When the IQ data is used in accordance with a typical QAM format, the I component symbol and Q component symbol modulate the amplitudes of orthogonal passband carrier signals (e.g., sinusoidal signals) to generate a modulated signal. The modulated signal propagates through a communication channel (e.g., over-the-air, optical fiber) and is received and demodulated by a receiver. The orthogonality characteristics of the carrier signals are used to demodulate the modulated signal at the receiver. The I component symbol and Q component symbol of the IQ data are then detected and decoded as received bits.

The IQ data may be based on a two-dimensional QAM constellation diagram that, in addition to representing a QAM-n encoding, may also represent a first PAM encoding in one dimension and a second PAM encoding in a second dimension. An example of a QAM-n constellation diagram that can be used to produce IQ data that may be used in QAM or PAM is discussed further herein with respect to FIG. 1.

Moreover, some embodiments disclosed herein enable utilization of a version of PAM-n where n is not an integer value of a power of 2 by establishing QAM communication and exploiting the relationship between QAM and PAM-n. For example, field programmable gate arrays (FPGAs) and/or configurable integrated circuits that provide PAM-n functions when n is not an integer power of 2, as well as the logical functionality behind the waveform-level modulation, may be compatible with QAM. PAM/QAM communication as described in this disclosure may enable devices that have a high-speed serializer-deserializer (SerDes) to be fully utilized for either or both wireless and wireline communication.

Furthermore, it may be interpreted that one QAM symbol is represented by two consecutive symbols: an I-symbol and a Q-symbol. For PAM/QAM communication, each QAM symbol may be treated as a PAM symbol. In some embodiments, the order of the two symbols may be opposite. Thus, baseband QAM modulation may be formed from consecutive PAM symbol modulation. This type of baseband QAM is also referred to herein as PAM/QAM.

For each symbol (e.g., the I symbol and the Q symbol), a time separation of 1 unit interval (UI) is used to form the QAM symbol. That is, when sampling the I symbol for 1 UI, there is no sampling of the Q symbol. Additionally, when sampling the Q symbol at another 1 UI, there is no sampling of the I symbol. Indeed, this sampling technique may enable technologies developed for QAM to be used for PAM-n, where n is not an integer power of 2. For example, there is no natural and unique mapping between information bits and the modulation symbols for traditionally defined PAM-6. However, it is possible to use the mapping developed for QAM-32 encoding and transmit the information with two consecutive PAM-6 symbols (I-PAM-6 and Q-PAM-6). While QAM-32 is described by way of example here, any suitable QAM-n constellation may be used to encode or decode IQ data.

Figure 1:
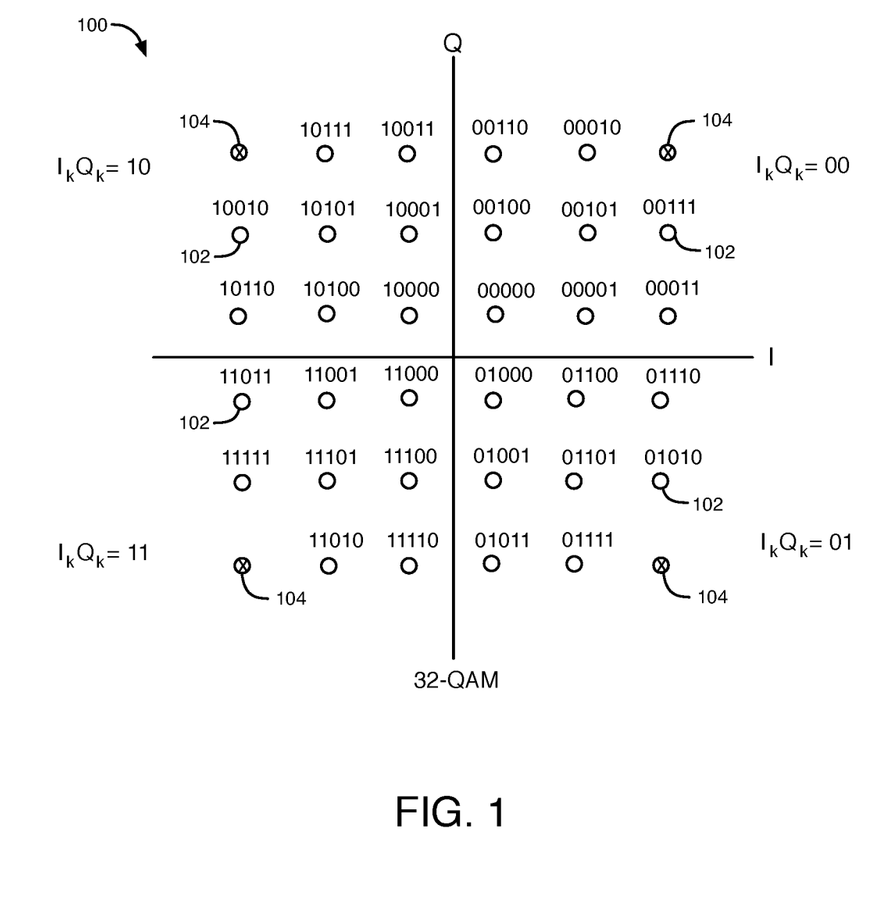
FIG. 1 illustrates a constellation diagram for QAM-32.

Figure (FIG. 1 illustrates a constellation diagram 100 for QAM-32. The symbols (I,Q) for QAM are often described by a constellation diagram. The constellation diagram 100 is a representation of a signal encoded by quadrature amplitude modulation (QAM) that can be modulated using pulse amplitude modulation (PAM). The constellation diagram 100 displays the signal as a two-dimensional plane scatter diagram in the complex plane at symbol sampling data points 102.

FIG. 1 shows 32 5-bit data points 102 for QAM-32. Each of the 32 5-bit data points 102 shown in FIG. 1 is a possible sequence of 5 input data bits that may be received by a transmitter for transmission using PAM-6. According to an exemplary embodiment of constellation diagram 100, the I-axis corresponds to an I symbol with 6 possible values of $-1, -\frac{3}{5}, -\frac{1}{5}, +\frac{1}{5}, +\frac{3}{5}, +1$, and the Q-axis corresponds to a Q symbol with 6 possible values of $-1, -\frac{3}{5}, -\frac{1}{5}, +\frac{1}{5}, +\frac{3}{5}, +1$. Each of the 32 5-bit data points 102 corresponds to a value of the I symbol and a value of the Q symbol.

The 2 QAM I and Q symbols at each of the 32 data points 102 in constellation diagram 100 correspond to 2 consecutive PAM-6 symbols. FIG. 1 effectively forms a QAM-32 constellation diagram through utilization of two consecutive PAM-6 symbols I and Q. With these two PAM-6 symbols (I and Q) of FIG. 1, a total of 5-bits of data is transmitted using one of 32 of the possible 36 combinations for QAM-32. QAM-32/PAM-6 can be used by SerDes circuits, for example, to transmit data at 224 Gbps.

A transmitter circuit encodes each 5-bit sequence received in the input data to an I symbol and a Q symbol that correspond to the data point 102 in the constellation diagram 100 for that 5-bit sequence in the input data as shown in FIG. 1. The transmitter circuit then generates a modulated data signal having the encoded I and Q symbols selected from diagram 100 using PAM-6. For example, the transmitter circuit encodes an input data sequence having a 5-bit value of 01101 to I and Q symbol values of $+\frac{3}{5}$ and $-\frac{3}{5}$, respectively, using diagram 100 for QAM-32, and then the transmitter circuit generates a modulated data signal having the I and Q symbol values of $+\frac{3}{5}$ and $-\frac{3}{5}$, respectively, using PAM-6. As another example, the transmitter circuit encodes an input data sequence having a 5-bit value of 10011 to I and Q symbol values of $-\frac{1}{5}$ and $+1$, respectively, using the diagram 100 for QAM-32, and then the transmitter circuit generates a modulated data signal having the I and Q symbol values of $-\frac{1}{5}$ and $+1$, respectively, using PAM-6.

When using PAM-6 for data transmission in SerDes, two symbols I and Q provide 36 possible values, of which 32 FQ values are mapped to 32 unique 5-bit input sequences, and 4 5-bit sequences are left unused, as shown in FIG. 1. In diagram 100 shown in FIG. 1, the four (I,Q) corners 104 of QAM-36 are removed for QAM-32. The upper right, lower right, upper left, and lower left unused corners 104 correspond to encoded FQ symbol values of (+1, +1), (+1, -1), (-1, +1), and (-1, -1), respectively.

According to some embodiments disclosed herein, auxiliary data provided for transmission through a data channel is mapped during encoding to four of the QAM-32 symbols or to the 4 unused corner symbol values 104 of the constellation diagram for QAM-32. The 4 unused corner symbol values 104 can be used to encode the auxiliary data and a subset of the regular data provided for transmission through the data channel. As an example, the auxiliary data may include back-channel transmitter equalization setting updates without affecting the transmitted data. Some dynamic environmental conditions, such as temperature changes or humidity changes, can affect the quality of data being transmitted through a data channel (e.g., a wired data channel between integrated circuits or a wireless data channel). Therefore, it is advantageous to provide a system for dynamically changing the equalization settings of a transmitter that transmits data through a data channel without having to reset the transmitter. According to some embodiments, a system is provided for changing equalization settings of a transmitter without disturbing the data channel by transmitting data to the transmitter using auxiliary data encoded with previously unused symbol values for QAM.

According to other embodiments, auxiliary data may be encoded for transmission through a data channel using previously unused symbol values for QAM to increase data throughput in the data channel (e.g., by approximately 1% with a high probability). These embodiments can also increase the efficiency for encoding the data in the data channel by approximately 1%. Data may also be transmitted through a data channel using previously unused symbol values for QAM for other non-time urgent auxiliary communications. According to some embodiments, data may be transmitted through a data channel using previously unused I and Q symbols for QAM as PAM-6 or PAM-3 symbols.

Figure 2:
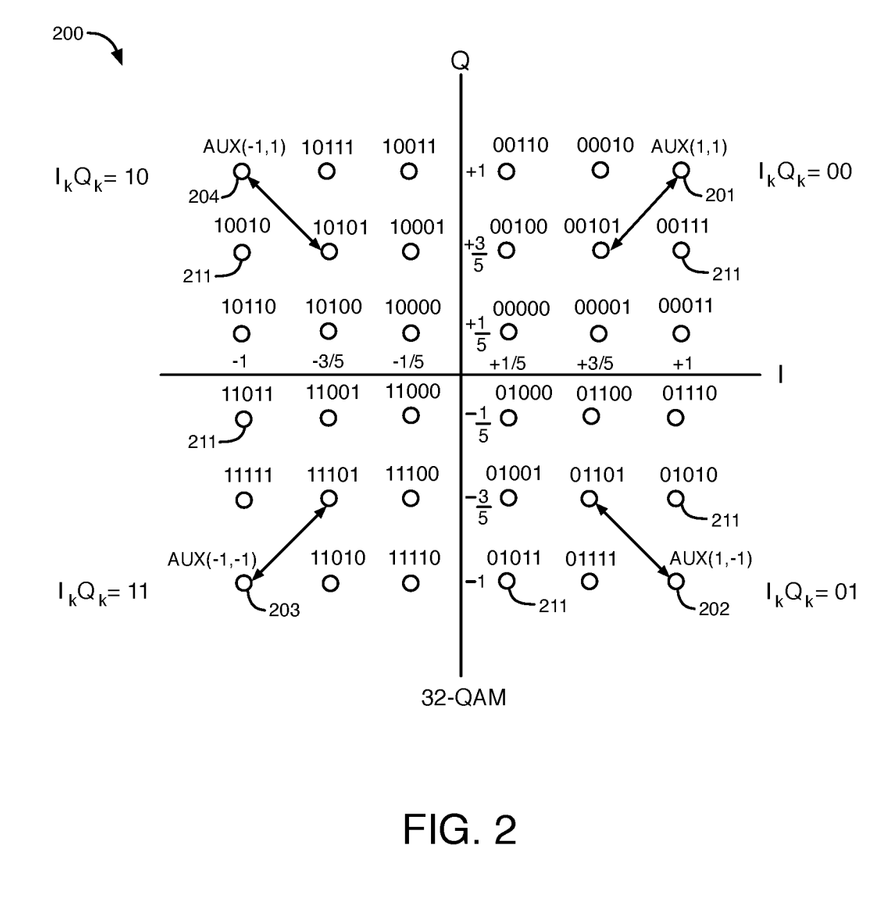
FIG. 2 illustrates an example of a constellation diagram for QAM-32 with the four unused corners of the constellation diagram of FIG. 1 being used to encode auxiliary data, according to an embodiment.

FIG. 2 illustrates an example of a constellation diagram 200 for QAM-32 encoding with the four corner symbol pairs I/Q of the constellation diagram 100 being used to encode auxiliary data, according to an embodiment. Constellation diagram 200 includes 32 5-bit data points 211 (8 in each quadrant). Each of the 32 data points 211 corresponds to a 5-bit input data sequence shown in FIG. 2 that is encoded by a transmitter to a unique pair of I and Q symbol values using QAM-32, as described with respect to FIG. 1. The I-axis of diagram 200 corresponds to the I symbol with 6 possible values of $-1, -\frac{3}{5}, -\frac{1}{5}, +\frac{1}{5}, +\frac{3}{5}$, and $+1$. The Q-axis of diagram 200 corresponds to the Q symbol with 6 possible values of $-1, -\frac{3}{5}, -\frac{1}{5}, +\frac{1}{5}, +\frac{3}{5}$, and $+1$.

FIG. 2 shows that auxiliary (AUX) data can be encoded by utilizing the previously unused I, Q corner symbol pairs of (+1, +1), (+1, -1), (-1, +1), and (-1, -1) in a QAM-32 constellation diagram. Points 201-204 in FIG. 2 correspond to the previously unused corner symbol pairs. In the embodiment of FIG. 2, the input data sequences of 00101, 01101, 11101, and 10101 are encoded as the I, Q symbol pairs of $(\frac{3}{5}, \frac{3}{5})$, $(\frac{3}{5}, -\frac{3}{5})$, $(-\frac{3}{5}, -\frac{3}{5})$, and $(-\frac{3}{5}, \frac{3}{5})$ at the 4 corresponding data points 211 or as the I, Q symbol pairs of (+1, +1), (+1, -1), (-1, -1), and (-1, +1) corresponding to points 201-204, respectively, as shown by the arrows in FIG. 2, depending on the value of an auxiliary data bit AUX.

Figure 3:
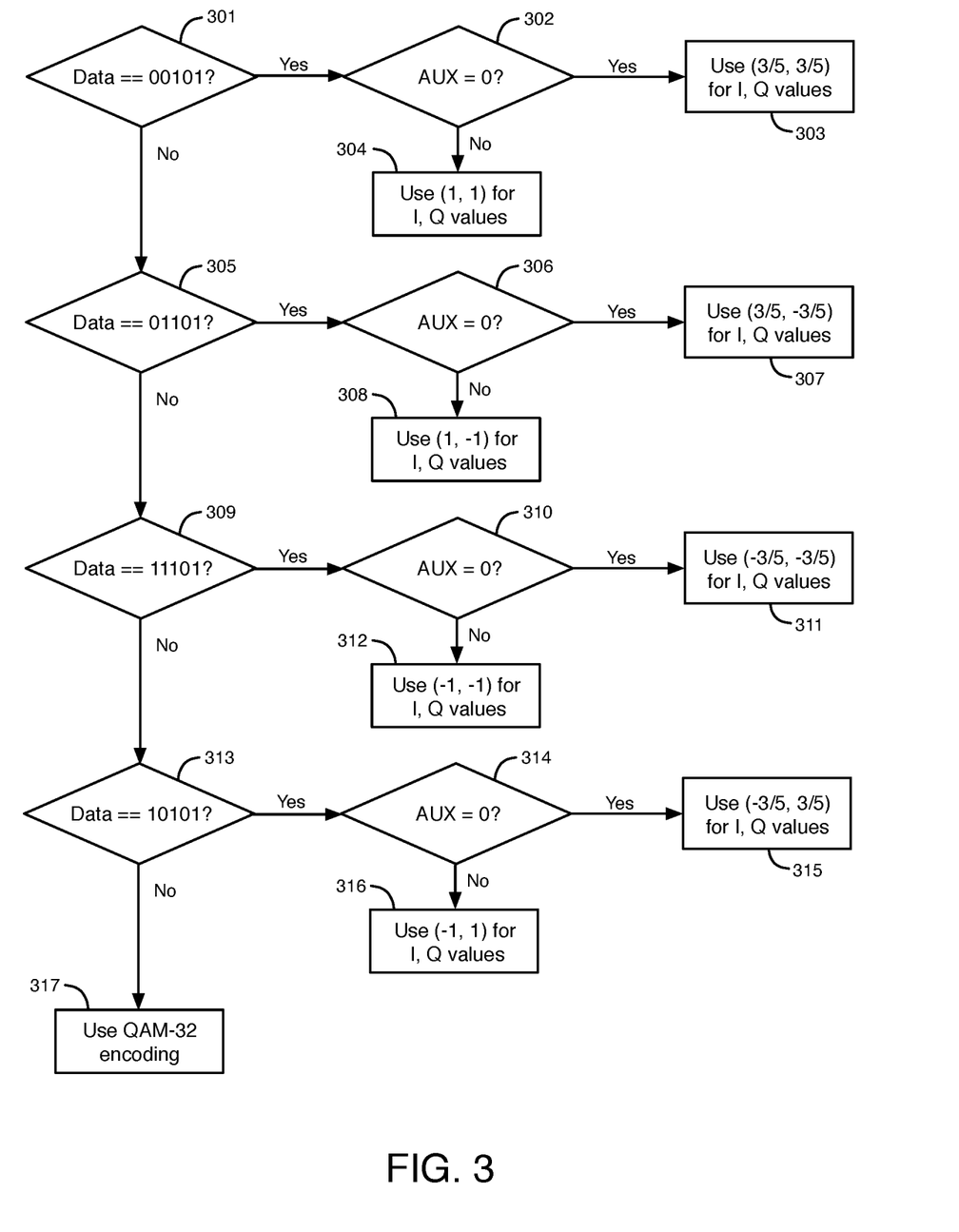
FIG. 3 is a flow chart that illustrates examples of operations that may be performed to encode auxiliary data for transmission using PAM-6 and QAM-32, according to an embodiment.

FIG. 3 is a flow chart that illustrates examples of operations that may be performed to encode auxiliary data for transmission with PAM-6 and QAM-32, according to an embodiment. Initially, a transmitter circuit receives input data, for example, from circuitry in the same integrated circuit (IC) as the transmitter circuit. The transmitter circuit analyzes the input data for encoding using QAM-32. The input data may include regular data (e.g., user data) and auxiliary (AUX) data.

In operation 301, the transmitter circuit determines if each set of 5-bits of regular data in the input data has a value of 00101. If the transmitter circuit determines that the regular data has a value of 00101 in operation 301, then the transmitter determines if 1-bit of corresponding auxiliary data (AUX) has a value of 0 in operation 302. If the transmitter determines that the auxiliary data (AUX) bit has a value of 0 in operation 302, then the transmitter encodes the 6-bits of input data (including the 5-bits of regular data and the 1-bit of AUX data) as the I, Q symbol values of (+⅗, +⅗) in operation 303, which correspond to the data point 211 for 00101 in constellation diagram 200. If the transmitter determines that the auxiliary data (AUX) bit has a value of 1 in operation 302, then the transmitter encodes the 6-bits of input data (including the 5-bits of regular data and the 1-bit of AUX data) as the I, Q symbol values of (+1, +1) in operation 304, which correspond to the previously unused point 201 in the upper right corner of constellation diagram 200.

If the transmitter determines that the 5-bits of regular data in the input data does not have a value of 00101 in operation 301, then the transmitter determines if the 5-bits of regular data in the input data has a value of 01101 in operation 305. If the transmitter determines that the regular data has a value of 01101 in operation 305, then the transmitter determines if the 1-bit of corresponding auxiliary data (AUX) has a value of 0 in operation 306. If the transmitter determines that the auxiliary data (AUX) bit has a value of 0 in operation 306, then the transmitter encodes the 5-bits of regular data and the 1-bit of AUX data as the I, Q symbol values of (+⅗, −⅗) in operation 307, which correspond to the data point 211 for 01101 in constellation diagram 200. If the transmitter determines that the auxiliary data (AUX) bit has a value of 1 in operation 306, then the transmitter encodes the 5-bits of regular data and the 1-bit of AUX data as the I, Q symbol values of (+1, −1) in operation 308, which correspond to the previously unused point 202 in the lower right corner of constellation diagram 200.

If the transmitter determines that the 5-bits of regular data in the input data does not have a value of 01101 in operation 305, then the transmitter determines if the 5-bits of regular data has a value of 11101 in operation 309. If the transmitter determines that the 5-bits of regular data has a value of 11101 in operation 309, then the transmitter determines if the 1-bit of corresponding auxiliary data (AUX) has a value of 0 in operation 310. If the transmitter determines that the auxiliary data (AUX) bit has a value of 0 in operation 310, then the transmitter encodes the 5-bits of regular data and the 1-bit of AUX data as the I, Q symbol values of (−⅗, −⅗) in operation 311, which correspond to the data point 211 for 11101 in constellation diagram 200. If the transmitter determines that the auxiliary data (AUX) bit has a value of 1 in operation 310, then the transmitter encodes the 5-bits of regular data and the 1-bit of AUX data as the I, Q symbol values of (−1, −1) in operation 312, which correspond to the previously unused point 203 in the lower left corner of constellation diagram 200.

If the transmitter determines that the 5-bits of regular data in the input data does not have a value of 11101 in operation 309, then the transmitter determines if the 5-bits of regular data has a value of 10101 in operation 313. If the transmitter determines that the 5-bits of regular data has a value of 10101 in operation 313, then the transmitter determines if the 1-bit of corresponding auxiliary data (AUX) has a value of 0 in operation 314. If the transmitter determines that the auxiliary data (AUX) bit has a value of 0 in operation 314, then the transmitter encodes the 5-bits of regular data and the 1-bit of AUX data as the I, Q symbol values of (−⅗, +⅗) in operation 315, which correspond to the data point 211 for 10101 in constellation diagram 200. If the transmitter determines that the auxiliary data (AUX) bit has a value of 1 in operation 314, then the transmitter encodes the 5-bits of regular data and the 1-bit of AUX data as the I, Q symbol values of (−1, +1) in operation 316, which correspond to the previously unused point 204 in the upper left corner of constellation diagram 200. If the transmitter determines that the 5-bits of regular data in the input data does not have a value of 10101 in operation 313, then the transmitter encodes the 5-bits of regular data in the input data using QAM-32 encoding in operation 317 by mapping the remaining 28 possible 5-bit values to the corresponding I and Q symbol values using constellation diagram 200. A receiver that receives the data encoded using the operations 301-317 of FIG. 3 performs the inverse of these operations to demodulate and decode the received data.

In any pseudo-random input data stream, 1 bit of auxiliary data AUX is transmitted on average every eight 5-bit values (i.e., 40-bits) of regular data. However, there may be periods of time due to random variation that have very low occurrences of the 4 5-bit data patterns (00101, 01101, 11101, 10101) for the regular data used in the embodiments of FIGS. 2-3 that are less than the average of 1 out of 8. For this reason, the throughput of the auxiliary data AUX cannot be guaranteed for any particular subset of the input data stream.

In many systems, the input data is protected by an error detection and correction scheme, such as forward error correction (FEC). The auxiliary data AUX may or may not be protected by an error detection and correction scheme. As an example, the auxiliary data AUX may be protected by an error detection and correction scheme if the auxiliary data AUX is used to supplement the regular data in the input data stream. The error correction codes for performing error detection and correction of the auxiliary data AUX may, for example, be provided separately in the auxiliary data AUX stream.

According to various embodiments, the auxiliary data AUX may be provided to the transmitter in one auxiliary input data stream or in four separate auxiliary input data streams. In embodiments in which the auxiliary data is transmitted in 4 separate auxiliary input data streams, each of the 4 auxiliary input data streams transmits auxiliary data for one of the four 5-bit sequences (00101, 01101, 11101, or 10101) of regular data.

In other embodiments, input data may be encoded using alternative encodings to the QAM-32 encoding shown in FIG. 2. As an example, an alternative QAM-32 encoding may be used to encode input data (including auxiliary data) to generate I and Q symbol values that mirrors the top and bottom halves of the 32 5-bit values 211 in the constellation diagram 200 across the I axis. As another example, an alternative QAM-32 encoding may be used to encode input data and auxiliary data to generate encoded I and Q symbol values that mirrors the left and right halves of the 32 5-bit values 211 in the constellation diagram 200 across the Q axis.

According to other embodiments, PAM-3 signaling may be used to encode input data including auxiliary data using previously unused symbol values from QAM-8. PAM-3 is a modulation scheme that is used, for example, with 100BASE-T Ethernet (IEEE 802.3-2018 clause 97). Table 1 below shows the encoding used for PAM-3 in Ethernet, as an example.

TABLE 1

| B[2], B[1], B[0] | T[1], T[0] |
|---|---|
| 000 | −1, −1 |
| 001 | 0, −1 |
| 010 | −1, 0 |
| 011 | −1, +1 |

TABLE 1-continued

| B[2], B[1], B[0] | T[1], T[0] |
|---|---|
| 100 | +1, 0 |
| 101 | +1, −1 |
| 110 | +1, +1 |
| 111 | 0, +1 |

The first column of Table 1 shows each possible digital combination of 3-bit values that may be received in an input data stream. The three bits in each combination of 3-bit input values are referred to as B[2], B[1], B[0] in Table 1. In this example, a transmitter encodes an input data stream by mapping each 3-bit value (shown in the first column of Table 1) of regular data received in the input data stream to the corresponding encoded values for T[1] and T[0] (shown in the second column of Table 1) that are in the same row of Table 1 as the corresponding 3-bit value in the input data stream. For example, the transmitter encodes a 3-bit input data value of 100 to symbols (+1, 0). The symbol values for T[1] and T[0] represent two adjacent encoded PAM-3 symbols. The transmitter then generates a modulated data signal with the symbol values for T[1] and T[0] corresponding to the 3-bit input data value in the corresponding row of Table 1 using, for example, PAM-3 modulation.

In the PAM-3 encoding scheme shown in Table 1, the symbol combination (0, 0) for T[1] and T[0] is not used to encode the input data. According to an embodiment, regular input data having a 3-bit value of 011 is encoded to symbol values T[1] and T[0] of either (−1, +1) as shown in Table 1 or (0, 0), depending on the value of an auxiliary data bit corresponding to the 3-bit input data value of 011. For example, if the auxiliary data bit is 0, then a corresponding 3-bit value of 011 of regular data in an input data stream is encoded to symbol values of (−1, +1) for T[1] and T[0]. In this example, the 3-bit value of 011 of regular data is encoded to symbol values of (0, 0) for T[1] and T[0] if the corresponding auxiliary data bit is 1. In this embodiment, one additional bit is transmitted as auxiliary data on average for every 8 bits of regular data that are transmitted, and direct current (DC) balance is maintained.

According to an alternative embodiment for PAM-3 encoding, regular input data having a 3-bit value of 101 is encoded as symbol values for T[1] and T[0] of either (+1, −1) as shown in Table 1 or (0, 0), depending on the value of an auxiliary data bit corresponding to the 3-bit value of regular data. For example, if the auxiliary data bit is 0, then a corresponding 3-bit value of 101 of regular input data is encoded as symbol values of (+1, −1) for T[1] and T[0]. In this example, the 3-bit value of 101 of regular data is encoded to symbol values of (0, 0) for T[1] and T[0] if the corresponding auxiliary data bit is 1. In this embodiment, one additional bit is transmitted as auxiliary data on average for every 8 bits of regular data that are transmitted, and direct current (DC) balance is maintained.

The auxiliary data provided using embodiments disclosed herein can be used to provide a continuous mechanism to improve the performance of data channels. Many SerDes protocols, including Peripheral Component Interconnect Express (PCIe) and Ethernet, have mechanisms that allow a receiver to provide initial feedback to a transmitter about the quality of data transmitted by the transmitter and received by the receiver. These mechanisms may allow a receiver to make requests for the transmitter to make changes to improve the quality of the data received at the receiver. For example, the receiver may request that the transmitter increase the gain of the data transmission or change the transmission equalization settings. These changes are often a one-time event. For example, the transmission equalization should function properly, even as the conditions of the data channel change, such as the temperature or humidity. SerDes uses a one-time transmission adaptation that makes achieving a data channel that is robust across a wide temperature range more challenging. Using any of the embodiments disclosed herein, a SerDes receiver can transmit requests back to a SerDes transmitter using the auxiliary data AUX to change the transmission equalization settings, without taking up any of the bandwidth of the regular data transmitted in the main data stream, and without disrupting the upper layers of well-established protocols, such as Ethernet or PCIe.

As mentioned above, using the auxiliary data in PAM-6/QAM-32 encoding, an average of ⅛ bit per 5 bits of regular data is transmitted as auxiliary data. In practice, the data bits transmitted in a data channel have a chance of experiencing errors during transmission. Therefore, error detection and correction schemes, such as FEC, are typically used to correct most of the errors that occur in data transmitted through data channels. A typical goal for the error rate of data that has been corrected using FEC is between $1\times10^{-12}$ and $1\times10^{-15}$, with a stretch goal of $1\times10^{-18}$. As a specific example, a FEC encoder may analyze 5440 bits of input data at a time in an input data stream that is transmitted across a single data channel or multiple data channels. 5390 bits of each set of 5440 bits of input data includes a total of 1078 5-bit sets. Using a binomial distribution with p=⅛ and N=5390/5=1078, the probability that a transmitter will not be able to transmit at least 50 bits of auxiliary data AUX in each set of 5440 bits of input data is $1.1\times10^{-18}$.

According to some embodiments, a transmitter may transmit auxiliary data as regular data in a data channel in order to increase the throughput of the main data stream. Using the exemplary values discussed above, 50-bits of auxiliary data AUX can be allocated as regular data out of every 5390 bits of regular data received in the main data stream for a total throughput of 5440 bits transmitted in the main data stream. Thus, according to this example, all 5440 bits of input data are transmitted as regular data in the main data stream. If the transmitter in the data channel is not able to transmit the 50-bits received as auxiliary data AUX (e.g., a $1.1\times10^{-18}$ chance), the receiver in the data channel is not able to detect the error and declare the 5440-bit FEC frame of transmitted data as illegal. As a result, the error rate on a $5\times10^{-17}$ data channel doubles, and the error rate on a $1\times10^{-15}$ data channel only increases by 0.1%. In this example, the efficiency of the regular data transmitted in the main data stream is increased by 0.9%.

As another example, 40-bits of auxiliary data may be allocated as regular data to the main data stream out of every 5400 bits of regular data received in the main data stream for a total of 5440 bits. In this example, the chance of failure at the receiver is reduced to $6\times10^{-24}$ for a 0.7% increase in the regular data bits transmitted in the main data stream.

Using the embodiments disclosed herein for encoding auxiliary data, a transmitter can encode 135 auxiliary data bits on average for each set of approximately 5400 regular data bits in a main data stream. If, for example, only 40-bits or 50-bits of the auxiliary data is transmitted as regular data in the main data stream, a data channel has a significant amount of bandwidth left over on average for some of the auxiliary data to be used for other purposes (e.g., changing transmitter equalization settings).

In embodiments that use PAM-3/QAM-8 encoding, an example payload per FEC frame as used in Ethernet is 450 9-bit symbols for a total of 4050 bits. In this example, if 30 bits of auxiliary data are allocated as regular data out of every 4020 bits of regular data received in a main data stream, data transmission of the regular data succeeds in all but $1\times10^{-17}$ cases, and the data channel can achieve a 0.7% increase in the main data stream throughput.

Figure 4:
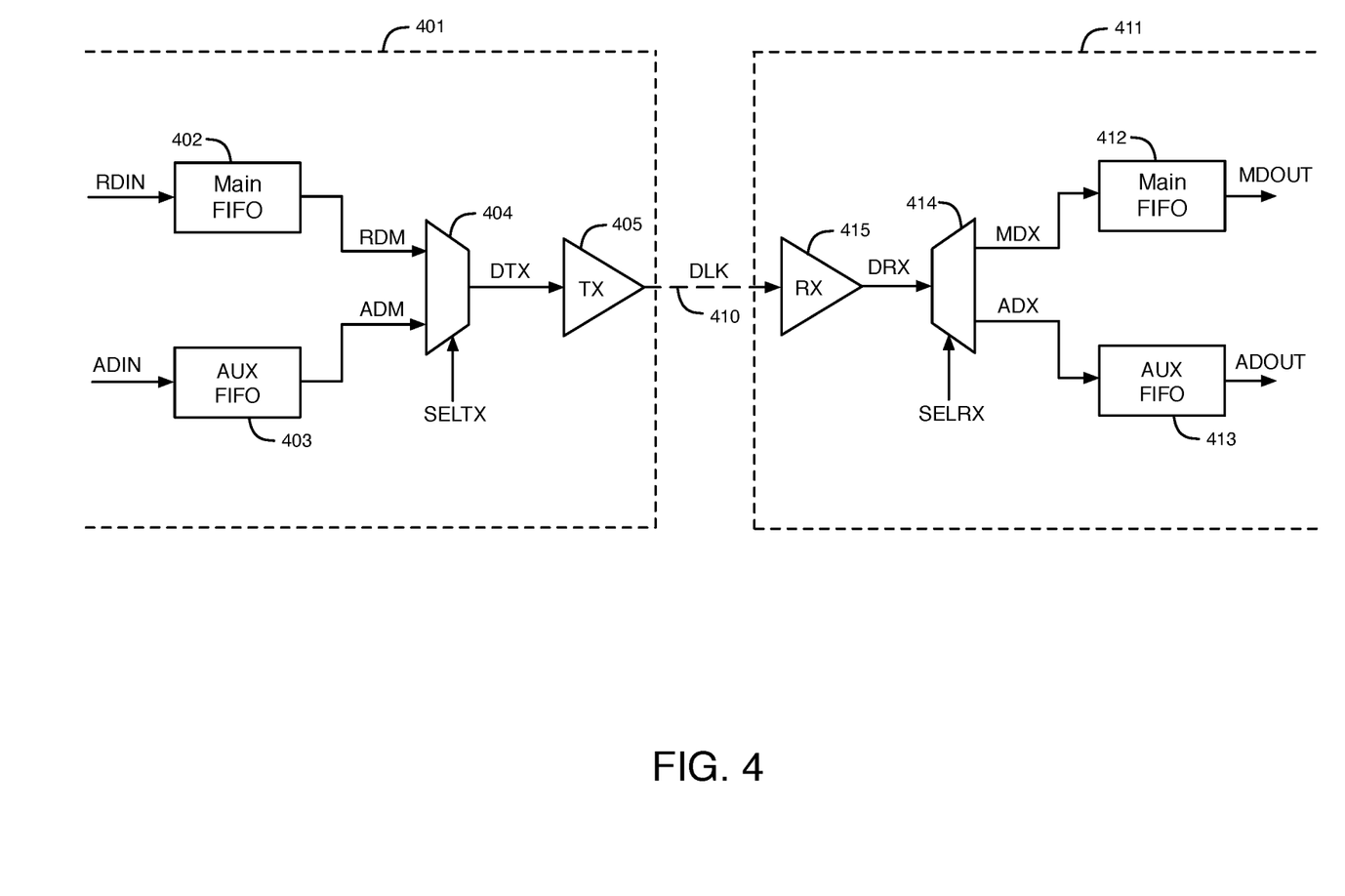
FIG. 4 illustrates an example of a data channel in a data transmission system that transmits auxiliary data according to embodiments disclosed herein.

FIG. 4 illustrates an example of a data channel in a data transmission system that transmits auxiliary data according to embodiments disclosed herein. The data channel of FIG. 4 includes portions of two integrated circuits (ICs) 401 and 411. ICs 401 and 411 may be any types of ICs, such as programmable logic ICs (e.g., FPGAs), microprocessors, graphics processing units, etc. Only a portion of each of integrated circuits 401 and 411 is shown in FIG. 4. Integrated circuit (IC) 401 has a transmitting portion of the data channel that includes a main first-in-first-out (FIFO) buffer circuit 402, an auxiliary (AUX) FIFO buffer circuit 403, a multiplexer circuit 404, and a transmitter circuit 405. IC 411 includes a receiving portion of the data channel that includes a main FIFO buffer circuit 412, an auxiliary (AUX) FIFO buffer circuit 413, a demultiplexer circuit 414, and a receiver circuit 415.

In FIG. 4, regular data bits in an input data stream RDIN are provided to an input of main FIFO buffer circuit 402. The regular data bits are stored in the FIFO buffer circuit 402 and then provided to a first data input of multiplexer circuit 404 as data RDM in a first-in-first-out manner. Auxiliary data bits ADIN are provided to an input of the AUX FIFO buffer circuit 403. The auxiliary data bits are stored in the AUX FIFO buffer circuit 403 and then provided to a second data input of multiplexer circuit 404 as data ADM in a first-in-first-out manner. Multiplexer circuit 404 provides the regular data bits and the auxiliary data bits (e.g., in series or in parallel) to one or more inputs of transmitter circuit 405 as data stream DTX in response to one or more select signals SELTX. Transmitter circuit 405 encodes the regular and auxiliary data bits in the data using one of the PAM/QAM encoding techniques disclosed herein, for example, with respect to FIGS. 2-3 or Table 1, to generate encoded symbols. Transmitter circuit 405 then uses the encoded symbols to generate a modulated data stream DLK that is transmitted through an external link 410 between ICs 401 and 411. Link 410 may be, for example, a wireline connection including one or more wires, or a wireless data link for wireless signals.

The data stream DLK is provided through link 410 to one or more inputs of receiver circuit 415. Receiver circuit 415 demodulates and decodes the data received in data stream DLK using one of the PAM/QAM decoding techniques disclosed herein, for example, with respect to FIGS. 2-3 or Table 1, to regenerate the regular data bits and the auxiliary data bits in an output data stream DRX. The output data stream DRX of the receiver circuit 415 is provided to an input of demultiplexer circuit 414. Demultiplexer circuit 414 provides the regular data bits from data stream DRX to main FIFO buffer circuit 412 as data stream MDX. Main FIFO buffer circuit 412 outputs the regular data bits in output data stream MDOUT. Demultiplexer circuit 414 provides the auxiliary data bits from data stream DRX to AUX FIFO buffer circuit 413 as data stream ADX. AUX FIFO buffer circuit 413 outputs the auxiliary data bits in output data stream ADOUT.

The following examples pertain to further embodiments. Example 1 is a data transmission system comprising: a transmitter circuit that receives regular data bits and auxiliary data bits and that encodes a first subset of the regular data bits to generate a first subset of encoded data comprising pairs of symbols that are used in quadrature amplitude modulation, wherein the transmitter circuit encodes the auxiliary data bits and a second subset of the regular data bits to generate a second subset of the encoded data comprising at least one pair of symbols that are unused for encoding by the quadrature amplitude modulation, and wherein the transmitter circuit generates a modulated output signal that indicates the first and second subsets of the encoded data using pulse amplitude modulation.

In Example 2, the data transmission system of Example 1 may optionally include, wherein the transmitter circuit encodes each of the auxiliary data bits by mapping a predefined value in a sequence of the regular data bits to a pair of symbols in a constellation diagram used for the quadrature amplitude modulation or a pair of corner symbols in the constellation diagram based on a value of the auxiliary data bit.

In Example 3, the data transmission system of any one of Examples 1-2 may optionally further comprise: a first first-in-first-out (FIFO) buffer circuit that stores the regular data bits and that provides the regular data bits to the transmitter circuit; and a second FIFO buffer circuit that stores the auxiliary data bits and that provides the auxiliary data bits to the transmitter circuit.

In Example 4, the data transmission system of any one of Examples 1 or 3 may optionally include, wherein the transmitter circuit uses the pulse amplitude modulation to generate one of a number N of different possible amplitudes for each pulse in the modulated output signal, and wherein N is not a power of 2.

In Example 5, the data transmission system of Example 4 may optionally include, wherein N equals 6, and wherein the transmitter circuit encodes each of the auxiliary data bits having a predefined value using one pair of symbols (+1, +1), (+1, −1), (−1, +1), or (−1, −1) to generate the second subset of the encoded data.

In Example 6, the data transmission system of Example 4 may optionally include, wherein N equals 3, and wherein the transmitter circuit encodes each of the auxiliary data bits having a predefined value using symbols (0, 0) to generate the second subset of the encoded data.

In Example 7, the data transmission system of any one of Examples 1-5 may optionally include, wherein a number of points in a constellation diagram for the quadrature amplitude modulation that correspond to a unique value of each sequence of 5 bits in the regular data bits is 32.

In Example 8, the data transmission system of any one of Examples 1 or 3-4 may optionally include, wherein 8 symbol pairs for the quadrature amplitude modulation correspond to unique 3-bit values in sequences of the regular data bits.

In Example 9, the data transmission system of any one of Examples 1-8 may optionally further comprise: a receiver circuit that receives the modulated output signal from the transmitter circuit, wherein the receiver circuit transmits information to the transmitter circuit that requests changes in analog coefficients or equalization settings that the transmitter circuit uses to generate the modulated output signal, and wherein the receiver circuit transmits the information to the transmitter circuit simultaneously with the transmitter circuit transmitting the modulated output signal to the receiver circuit.

In Example 10, the data transmission system of any one of Examples 1-9 may optionally include, wherein the transmitter circuit uses at least a subset of the auxiliary data bits to augment a main data stream that comprises the regular data bits.

Example 11 is a data transmission system comprising: a receiver circuit that receives a modulated data signal and that demodulates the modulated data signal using pulse amplitude modulation to generate encoded data, wherein the receiver circuit decodes a first subset of the encoded data to generate a first subset of regular data bits using symbols that are used for encoding in quadrature amplitude modulation, and wherein the receiver circuit decodes a second subset of the encoded data to generate auxiliary data bits and a second subset of the regular data bits using at least one pair of symbols that are unused for encoding by the quadrature amplitude modulation.

In Example 12, the data transmission system of Example 11 may optionally include, wherein the receiver circuit decodes the second subset of the encoded data at least in part by mapping a pair of corner symbols in a constellation diagram for the quadrature amplitude modulation to a predefined sequence of bits in the second subset of the regular data bits and to one of the auxiliary data bits.

In Example 13, the data transmission system of Example 11 may optionally include, wherein the receiver circuit demodulates the modulated data signal using the pulse amplitude modulation based on one of a number N of different possible amplitudes for each pulse in the modulated data signal, and wherein N is not a power of 2.

In Example 14, the data transmission system of Example 13 may optionally include, wherein N equals 6, and wherein a constellation diagram for the quadrature amplitude modulation has only 32 points that correspond to unique values for each sequence of 5 bits of the regular data bits.

In Example 15, the data transmission system of Example 13 may optionally include, wherein N equals 3, and wherein a constellation diagram for the quadrature amplitude modulation has only 8 points that correspond to unique values for each sequence of 3 bits of the regular data bits.

Example 16 is a method for transmitting data in a data transmission system, the method comprising: receiving regular data bits and auxiliary data bits at a transmitter circuit; encoding a first subset of the regular data bits with the transmitter circuit to generate a first subset of encoded data comprising pairs of symbols that are used for encoding in quadrature amplitude modulation; encoding the auxiliary data bits and a second subset of the regular data bits with the transmitter circuit to generate a second subset of the encoded data comprising at least one pair of symbols that are unused for encoding by the quadrature amplitude modulation; and generating a modulated output signal that indicates the first and second subsets of the encoded data using pulse amplitude modulation with the transmitter circuit.

In Example 17, the method of Example 16 may optionally include, wherein encoding the auxiliary data bits and the second subset of the regular data bits with the transmitter circuit comprises encoding each of the auxiliary data bits by mapping a predefined value in a sequence of the regular data bits to a pair of symbols in a constellation diagram used for the quadrature amplitude modulation or a pair of corner symbols in the constellation diagram unused by the quadrature amplitude modulation based on a value of the auxiliary data bit.

In Example 18, the method of any one of Examples 16-17 may optionally include, wherein generating the modulated output signal that indicates the first and second subsets of the encoded data using pulse amplitude modulation (PAM) further comprises generating the modulated output signal using PAM-6.

In Example 19, the method of Example 16 may optionally include, wherein generating the modulated output signal that indicates the first and second subsets of the encoded data using pulse amplitude modulation (PAM) further comprises generating the modulated output signal using PAM-3.

In Example 20, the method of any one of Examples 16-18 may optionally include, wherein encoding the first subset of the regular data bits with the transmitter circuit comprises encoding the first subset of the regular data bits using 32 points in a constellation diagram for the quadrature amplitude modulation that correspond to 32 unique 5-bit values in the regular data bits.

The foregoing description of the exemplary embodiments has been presented for the purpose of illustration. The foregoing description is not intended to be exhaustive or to be limiting to the examples disclosed herein. In some instances, various features can be employed without a corresponding use of other features as set forth. Many modifications, substitutions, and variations are possible in light of the above teachings, without departing from the scope of the present embodiments.

What is claimed is:

1. A data transmission system comprising:
   a transmitter circuit that receives regular data bits and auxiliary data bits, wherein the transmitter circuit encodes a first subset of the regular data bits and a first one of the auxiliary data bits as a first pair of symbols in a constellation diagram used for quadrature amplitude modulation if the first subset of the regular data bits has a first predefined value and the first one of the auxiliary data bits has a second predefined value, wherein the transmitter circuit encodes the first subset of the regular data bits and the first one of the auxiliary data bits as a second pair of symbols in the constellation diagram that are unused for encoding by the quadrature amplitude modulation if the first subset of the regular data bits has the first predefined value and the first one of the auxiliary data bits has a third predefined value, and wherein the transmitter circuit generates a modulated output signal that indicates the first pair of symbols and the second pair of symbols using pulse amplitude modulation.

2. The data transmission system of claim 1, wherein the transmitter circuit encodes a second subset of the regular data bits and a second one of the auxiliary data bits as a third pair of symbols in the constellation diagram used for the quadrature amplitude modulation if the second subset of the regular data bits has a fourth predefined value and the second one of the auxiliary data bits has the second predefined value, and wherein the transmitter circuit encodes the second subset of the regular data bits and the second one of the auxiliary data bits as a fourth pair of symbols in the constellation diagram that are unused for encoding by the quadrature amplitude modulation if the second subset of the regular data bits has the fourth predefined value and the second one of the auxiliary data bits has the third predefined value.

3. The data transmission system of claim 1 further comprising:
   a first first-in-first-out (FIFO) buffer circuit that stores the regular data bits and that provides the regular data bits to the transmitter circuit; and a second FIFO buffer circuit that stores the auxiliary data bits and that provides the auxiliary data bits to the transmitter circuit.

4. The data transmission system of claim 1, wherein the transmitter circuit uses the pulse amplitude modulation to generate one of a number N of different possible amplitudes for each pulse in the modulated output signal, and wherein N is not a power of 2.

5. The data transmission system of claim 4, wherein N equals 6, and wherein the transmitter circuit encodes each of the auxiliary data bits having the third predefined value as (+1,+1), (+1,−1), (−1,+1), or (−1,−1).

6. The data transmission system of claim 4, wherein N equals 3.

7. The data transmission system of claim 1, wherein a number of points in the constellation diagram for the quadrature amplitude modulation that correspond to a unique value of each sequence of 5 bits in the regular data bits is 32.

8. The data transmission system of claim 1, wherein 8 symbol pairs for the quadrature amplitude modulation correspond to unique 3-bit values in sequences of the regular data bits.

9. The data transmission system of claim 1 further comprising:
a receiver circuit that receives the modulated output signal from the transmitter circuit, wherein the receiver circuit transmits information to the transmitter circuit that requests changes in analog coefficients or equalization settings that the transmitter circuit uses to generate the modulated output signal, and wherein the receiver circuit transmits the information to the transmitter circuit simultaneously with the transmitter circuit transmitting the modulated output signal to the receiver circuit.

10. The data transmission system of claim 1, wherein the transmitter circuit uses at least a subset of the auxiliary data bits to augment a main data stream that comprises the regular data bits.

11. A data transmission system comprising:
a receiver circuit that receives a modulated data signal and that demodulates the modulated data signal using pulse amplitude modulation to generate encoded data, wherein the receiver circuit decodes a first subset of the encoded data to generate a first subset of regular data bits having a first value and a first auxiliary data bit having a second value using first symbols in a constellation diagram that are used for encoding by quadrature amplitude modulation, and wherein the receiver circuit decodes a second subset of the encoded data to generate a second subset of the regular data bits having the first value and a second auxiliary data bit having a third value using second symbols in the constellation diagram that are unused for encoding by the quadrature amplitude modulation.

12. The data transmission system of claim 11, wherein the regular data bits having a fourth value and a third auxiliary data bit having the second value using third symbols in the constellation diagram that are used for encoding by the quadrature amplitude modulation, and wherein the receiver circuit decodes a fourth subset of the encoded data to generate a fourth subset of the regular data bits having the fourth value and a fourth auxiliary data bit having the third value using fourth symbols in a corner of the constellation diagram.

13. The data transmission system of claim 11, wherein the receiver circuit demodulates the modulated data signal using the pulse amplitude modulation based on one of a number N of different possible amplitudes for each pulse in the modulated data signal, and wherein N is not a power of 2.

14. The data transmission system of claim 13, wherein N equals 6, and wherein the constellation diagram for the quadrature amplitude modulation has only 32 points that correspond to unique values for each sequence of 5 bits of the regular data bits.

15. The data transmission system of claim 13, wherein N equals 3, and wherein the constellation diagram for the quadrature amplitude modulation has only 8 points that correspond to unique values for each sequence of 3 bits of the regular data bits.

16. A method for transmitting data in a data transmission system, the method comprising:
receiving regular data bits and auxiliary data bits at a transmitter circuit;
encoding a first subset of the regular data bits and a first one of the auxiliary data bits with the transmitter circuit as a first pair of symbols in a constellation diagram used for quadrature amplitude modulation if the first subset of the regular data bits has a first predefined value and the first one of the auxiliary data bits has a second predefined value;
encoding the first subset of the regular data bits and the first one of the auxiliary data bits with the transmitter circuit as a second pair of symbols in the constellation diagram that are unused for encoding by the quadrature amplitude modulation if the first subset of the regular data bits has the first predefined value and the first one of the auxiliary data bits has a third predefined value; and
generating a modulated output signal that indicates the first pair of symbols and the second pair of symbols using pulse amplitude modulation with the transmitter circuit.

17. The method of claim 16 further comprising:
encoding a second subset of the regular data bits and a second one of the auxiliary data bits with the transmitter circuit as a third pair of symbols in the constellation diagram used for quadrature amplitude modulation if the second subset of the regular data bits has a fourth predefined value and the second one of the auxiliary data bits has the second predefined value; and
encoding the second subset of the regular data bits and the second one of the auxiliary data bits with the transmitter circuit as a fourth pair of symbols in the constellation diagram that are unused for encoding by the quadrature amplitude modulation if the second subset of the regular data bits has the fourth predefined value and the second one of the auxiliary data bits has the third predefined value.

18. The method of claim 16, wherein generating the modulated output signal that indicates the first pair of symbols and the second pair of symbols using pulse amplitude modulation (PAM) further comprises generating the modulated output signal using PAM-6.

19. The method of claim 16, wherein generating the modulated output signal that indicates the first pair of symbols and the second pair of symbols using pulse amplitude modulation (PAM) further comprises generating the modulated output signal using PAM-3.

20. The method of claim 16, wherein encoding the first subset of the regular data bits and the first one of the auxiliary data bits with the transmitter circuit as the first pair of symbols in the constellation diagram used for quadrature amplitude modulation if the first subset of the regular data bits has the first predefined value and the first one of the auxiliary data bits has the second predefined value comprises encoding the first subset of the regular data bits using 32 points in the constellation diagram for the quadrature amplitude modulation that correspond to 32 unique 5-bit values in the regular data bits.

* * * * *